United States Patent
Kim et al.

(10) Patent No.: US 9,924,543 B2
(45) Date of Patent: Mar. 20, 2018

(54) METHOD AND APPARATUS FOR CONFIGURING RANDOM ACCESS SEQUENCE LENGTH FOR HIGH CARRIER FREQUENCY BAND IN WIRELESS COMMUNICATION SYSTEM

(71) Applicant: LG ELECTRONICS INC., Seoul (KR)

(72) Inventors: Kitae Kim, Seoul (KR); Jinmin Kim, Seoul (KR); Hyunsoo Ko, Seoul (KR); Jaehoon Chung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 114 days.

(21) Appl. No.: 14/764,002

(22) PCT Filed: Jan. 28, 2014

(86) PCT No.: PCT/KR2014/000786
§ 371 (c)(1),
(2) Date: Jul. 28, 2015

(87) PCT Pub. No.: WO2014/119898
PCT Pub. Date: Aug. 7, 2014

(65) Prior Publication Data
US 2015/0365978 A1    Dec. 17, 2015

Related U.S. Application Data

(60) Provisional application No. 61/757,719, filed on Jan. 29, 2013, provisional application No. 61/867,140, filed on Aug. 18, 2013.

(51) Int. Cl.
*H04W 74/00* (2009.01)
*H04W 74/08* (2009.01)
(Continued)

(52) U.S. Cl.
CPC ..... *H04W 74/0833* (2013.01); *H04J 13/0062* (2013.01); *H04L 5/0048* (2013.01);
(Continued)

(58) Field of Classification Search
CPC ..... H04W 72/04; H04W 56/00; H04W 28/18; H04W 48/12; H04W 74/00; H04L 5/0094
See application file for complete search history.

(56) References Cited

U.S. PATENT DOCUMENTS

2009/0109919 A1    4/2009    Bertrand et al.
2010/0220798 A1    9/2010    Trachewsky
(Continued)

FOREIGN PATENT DOCUMENTS

JP    2011-109715    6/2011
KR    10-2010-0051787    5/2010

OTHER PUBLICATIONS

PCT International Application No. PCT/KR2014/000786, Written Opinion of the International Searching Authority dated May 20, 2014, 10 pages.

*Primary Examiner* — Raj Jain
(74) *Attorney, Agent, or Firm* — Lee Hong Degerman Kang Waimey

(57) ABSTRACT

A method of receiving a random access sequence by a base station in a wireless communication system is disclosed. The method includes transmitting information on at least one of random access formats for different effective channel lengths to the user equipment from a base station, and transmitting a random access sequence based on the at least one random access format from the base station, wherein the random access formats have different lengths of effective channel section for receiving the random access sequence.

11 Claims, 13 Drawing Sheets

(51) Int. Cl.
   *H04W 56/00*    (2009.01)
   *H04L 27/26*    (2006.01)
   *H04J 13/00*    (2011.01)
   *H04L 5/00*     (2006.01)

(52) U.S. Cl.
   CPC ......... *H04L 27/2613* (2013.01); *H04W 56/00* (2013.01); *H04W 74/00* (2013.01); *H04W 74/006* (2013.01); *H04L 5/0094* (2013.01)

(56) References Cited

U.S. PATENT DOCUMENTS

| | | | | |
|---|---|---|---|---|
| 2011/0044282 A1* | 2/2011 | Seo | ........................ | H04L 5/0053 370/329 |
| 2011/0235529 A1* | 9/2011 | Zetterberg | ............ | H04L 5/0053 370/248 |
| 2012/0099549 A1* | 4/2012 | Imamura | ............ | H04W 74/002 370/329 |
| 2014/0086169 A1* | 3/2014 | Bao | ........................ | H04W 48/12 370/329 |
| 2015/0146631 A1* | 5/2015 | Kim | .................. | H04W 74/0833 370/329 |
| 2015/0365924 A1* | 12/2015 | Gao | ......................... | H04L 1/08 370/329 |

* cited by examiner

E-UMTS (a) contol - plane protocol stack (b) user - plane protocol stack

METHOD AND APPARATUS FOR CONFIGURING RANDOM ACCESS SEQUENCE LENGTH FOR HIGH CARRIER FREQUENCY BAND IN WIRELESS COMMUNICATION SYSTEM

CROSS-REFERENCE TO RELATED APPLICATIONS

This application is the National Stage filing under 35 U.S.C. 371 of International Application No. PCT/KR2014/000786, filed on Jan. 28, 2014, which claims the benefit of U.S. Provisional Application Ser. Nos. 61/757,719, filed on Jan. 29, 2013 and 61/867,140, filed on Aug. 18, 2013, the contents of which are all hereby incorporated by reference herein in their entirety.

TECHNICAL FIELD

The present invention relates to a wireless communication system, and more particularly, to a method and apparatus for configuring a random access sequence length for a high carrier frequency band in a wireless communication system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.4, 3, 5, 10, 15 and 20 MHz and provides Downlink (DL) or Uplink (UL) transmission service to a plurality of UEs in the bandwidth. Different cells may be configured so as to provide-different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies on a method and apparatus for configuring a random access sequence length for a high carrier frequency band in a wireless communication system.

Technical Solution

The object of the present invention can be achieved by providing a method for receiving a random access sequence by a base station in a wireless communication system, the method including selecting at least one of random access formats for different effective channel lengths, transmitting information on the at least one selected random access format to a user equipment, and receiving a random access sequence based on the at least one selected random access format from the user equipment, wherein the random access formats have different lengths of effective channel section for receiving the random access sequence. The random access sequence may be a Zadoff-Chu (ZC) sequence.

Here, the selecting may include selecting a random access format for a maximum effective channel section length when a reception delay value of the user equipment is equal to or more than a preset value. Alternatively, the selecting may include selecting a random access format for a maximum effective channel section length when the user equipment is an initial access user equipment.

In addition, a plurality random access formats may be for respective different sequence regions of the random access sequence when the plural random access formats are selected from the random access formats.

In another aspect of the present invention, provided herein is a method of transmitting a random access sequence by a user equipment in a wireless communication system, the method including transmitting information on at least one of random access formats for different effective channel lengths to the user equipment from a base station, and transmitting a random access sequence based on the at least one random access format from the base station, the random access formats have different lengths of effective channel section for receiving the random access sequence. The random access sequence may be a Zadoff-Chu (ZC) sequence.

Here, the at least one random access format may be a random access format for a maximum effective channel section length when a reception delay value of the user equipment is equal to or more than a preset value. Alternatively, the at least one random access format may be a random access format for a maximum effective channel section length when the user equipment is an initial access user equipment.

In addition, a plurality random access formats may be for respective different sequence regions of the random access sequence when information on the plural random access formats is received from the base station.

Random access formats of the different effective channel lengths may have different numbers of supportable user equipments, and a random access format for a maximum effective channel section length may have the supportable user equipments with a minimum number.

Advantageous Effects

According to embodiments of the present invention, a user equipment may effectively transmit a random access sequence in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

Figure 1:
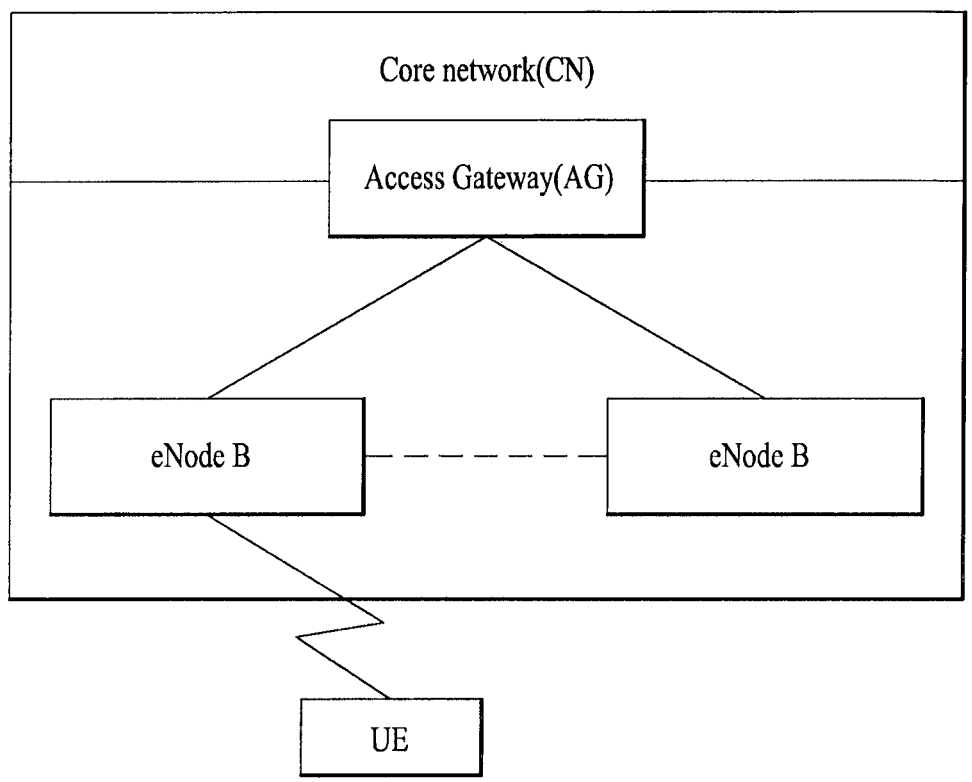
FIG. 1 illustrates a configuration of an Evolved Universal Mobile Telecommunications System (E-UMTS) network as an example of a wireless communication system.
Figure 2:
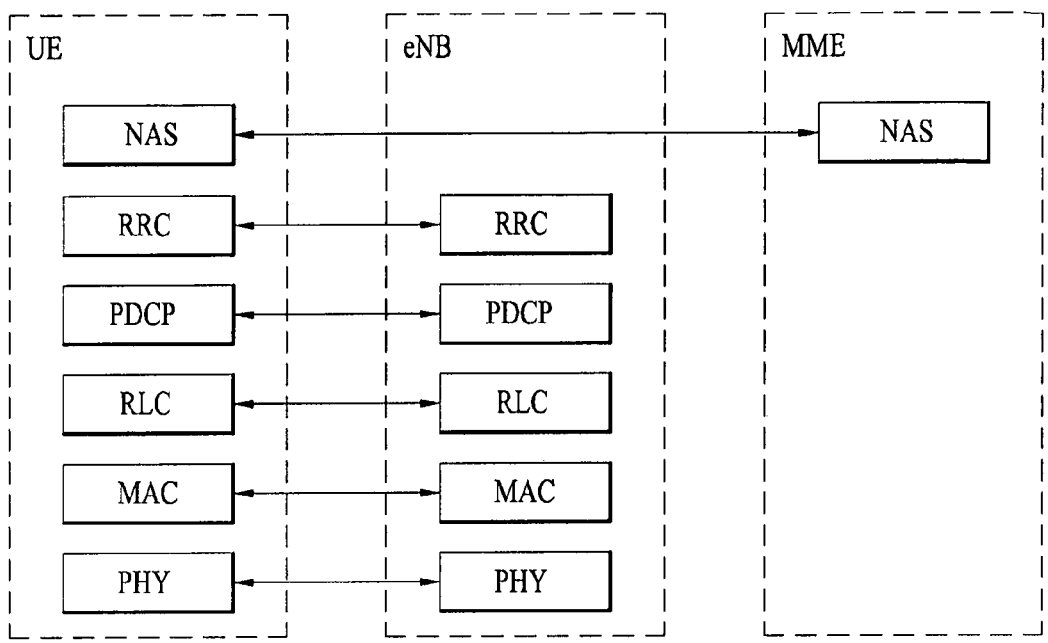
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN)
Figure 2:
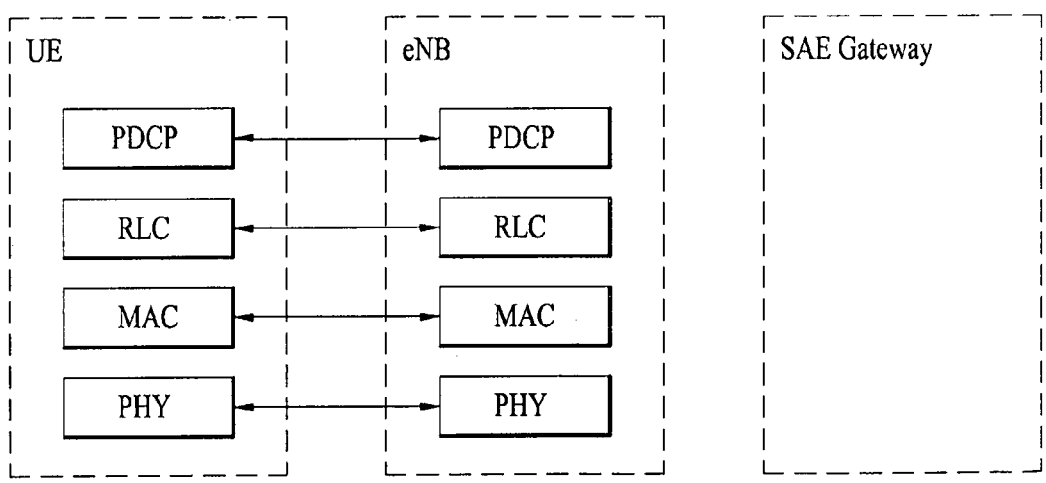

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell covered by an eNB is set to one of the bandwidths of 1.4, 3, 5, 10, 15, and 20 MHz and provides downlink or uplink transmission service in the bandwidth to a plurality of UEs. Different cells may be set to provide different bandwidths.

Downlink transport channels used to deliver data from the E-UTRAN to UEs include a Broadcast Channel (BCH) carrying system information, a Paging Channel (PCH) carrying a paging message, and a Shared Channel (SCH) carrying user traffic or a control message. Downlink multicast traffic or control messages or downlink broadcast traffic or control messages may be transmitted on a downlink SCH or a separately defined downlink Multicast Channel (MCH). Uplink transport channels used to deliver data from a UE to the E-UTRAN include a Random Access Channel (RACH) carrying an initial control message and an uplink SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
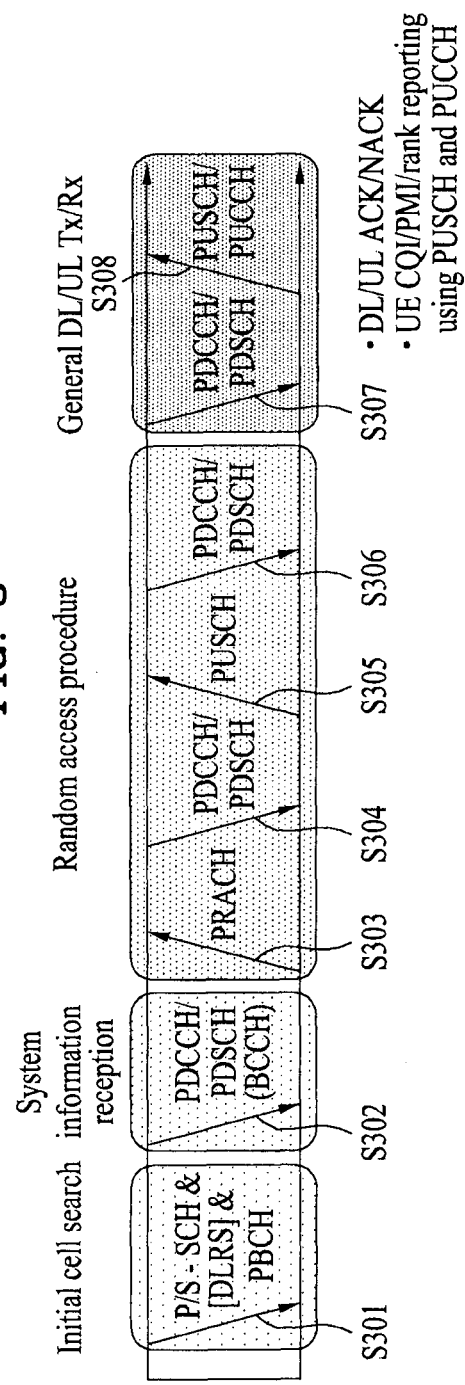
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In case of a contention-based RACH, the UE may additionally perform a contention resolution procedure.

After the above procedure, the UE may receive a PDCCH and/or a PDSCH from the eNB (S307 and transmit a Physical Uplink Shared Channel (PUSCH) and/or a Physical Uplink Control Channel (PUCCH) to the eNB (S308), which is a general downlink and uplink signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the uplink or receives from the eNB on the downlink includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
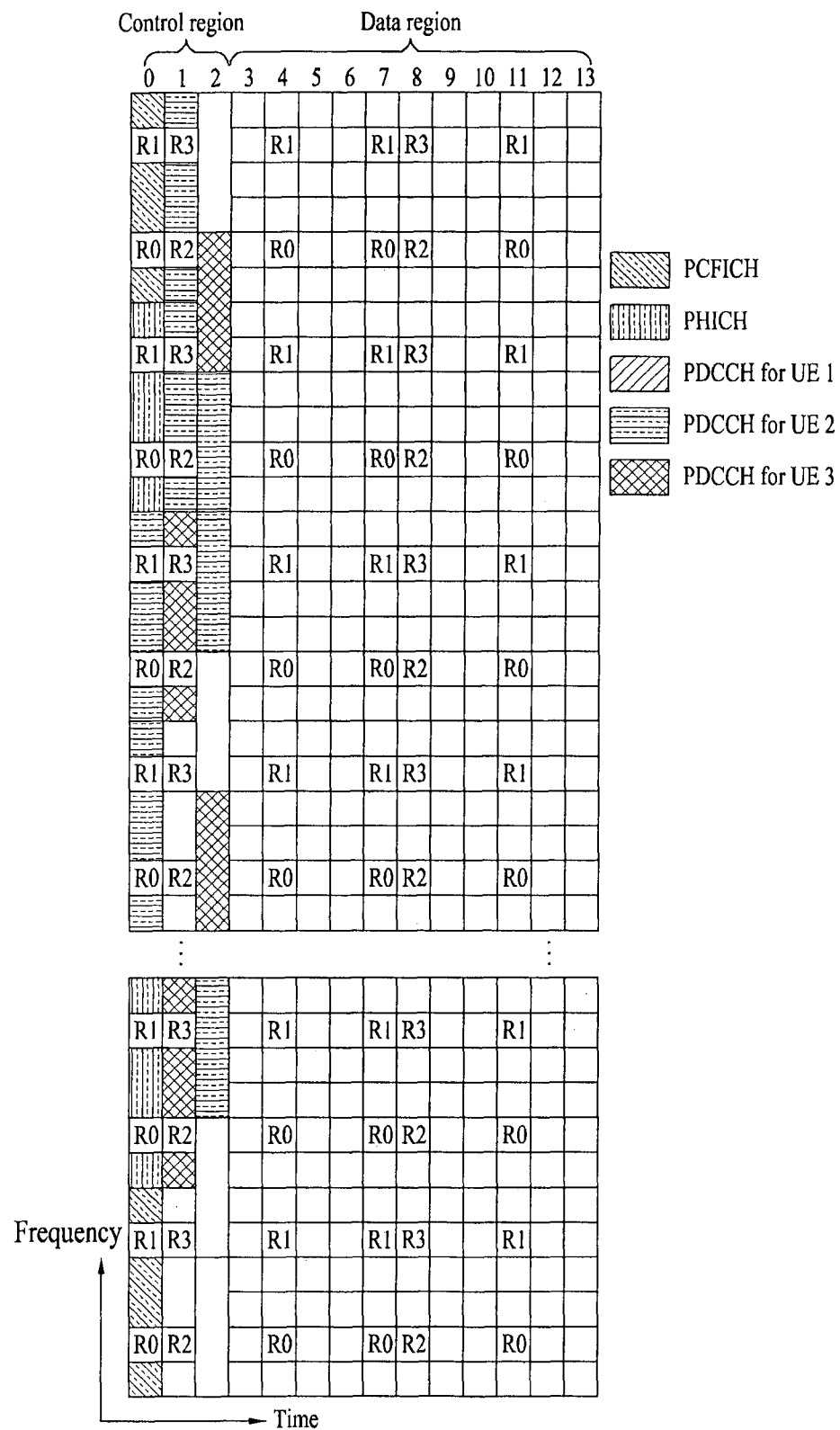
FIG. 4 illustrates a structure of a downlink radio frame in a Long Term Evolution (LTE) system.

FIG. 4 illustrates exemplary control channels included in the control region of a subframe in a DL radio frame.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 4, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH indicates 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Herein, n is 1 or a larger integer indicated by the PCFICH.

The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 5:
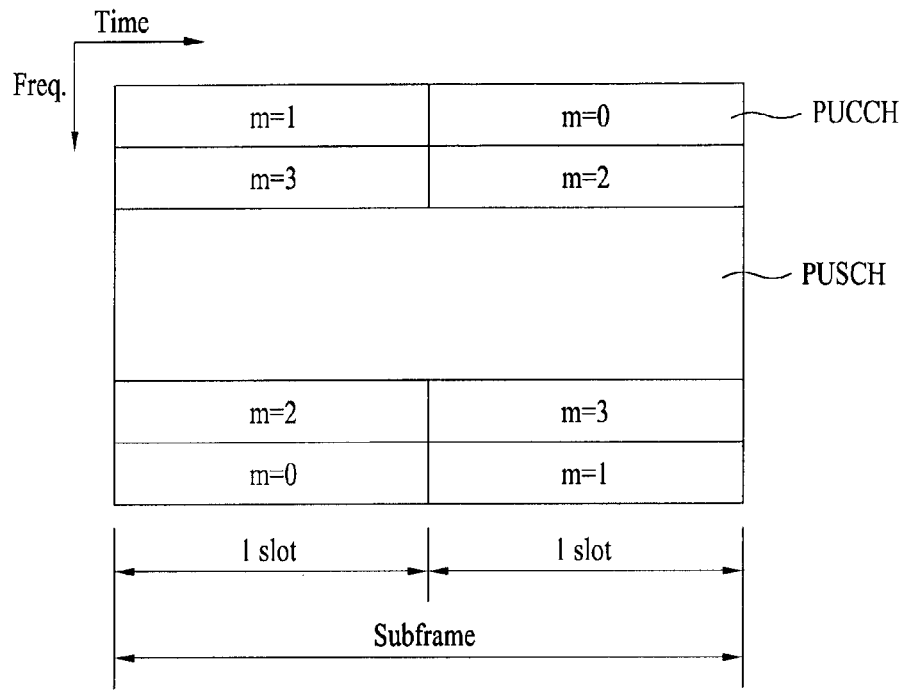
FIG. 5 illustrates a structure of an uplink subframe in the LTE system.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one Resource Block (RB) in each slot of a subframe. That is, the two RBs allocated to the PUCCH frequency-hop over the slot boundary of the subframe. Particularly, PUCCHs with m=0, m=1, and m=2 are allocated to a subframe in FIG. 5.

Introduction of local areas to the LTE system in the future is under consideration. To reinforce service support per user, it is expected that a new cell will be deployed based on the concept of local area access.

Figure 6:
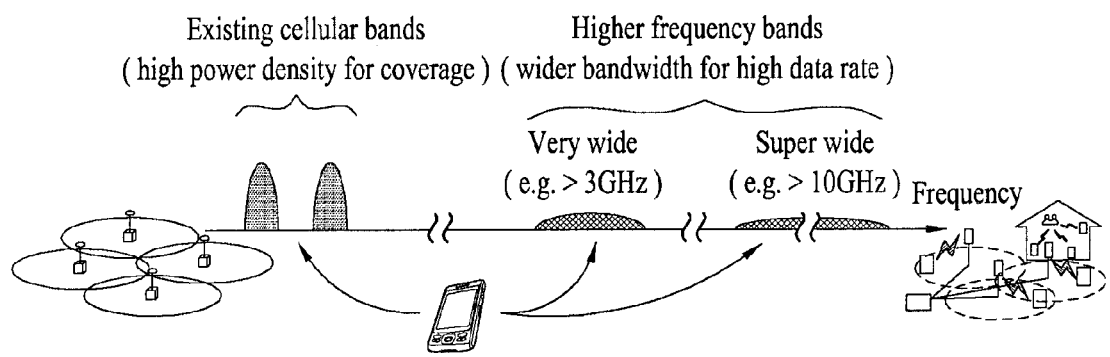
FIG. 6 illustrates the concept of a small cell, which is expected to be introduced to the LTE system.

FIG. 6 illustrates the concept of a small cell, which is expected to be introduced to the LTE system.

Referring to FIG. 6, it is expected that a wider system bandwidth is set in a frequency band having a higher center frequency, not in a frequency band used in the legacy LTE system. Basic cell coverage may be supported based on a control signal such as system information in an existing cellular frequency band, whereas data may be transmitted with maximum transmission efficiency in a wider frequency band in a high-frequency small cell. Thus, the concept of local area access targets at UEs with low-to-medium mobility in a small area and small cells will be deployed, each having a distance between a Base Station (BS) and a UE in units of 100 m, smaller than existing cells having distances between a UE and a BS in units of km.

Due to shorter distances between UEs and a BS and the use of a high carrier frequency, these small cells may have the following channel characteristics.

First of all, from the perspective of delay spread, as the distance between a BS and a UE is shorter, a signal delay may be also shorter. If the same OFDM-based frame as used in the LTE system is adopted, a subcarrier spacing may be set to an extremely large value, for example, a value larger than the existing subcarrier spacing 15 kHz because a relatively wide frequency band is allocated. A Doppler's frequency is higher in a high frequency band than in a low frequency band, for the same UE speed. Therefore, a coherence time may be extremely short. The coherence time is the time over which a channel has static or uniform characteristics. A coherent bandwidth is a bandwidth in which a channel has static or uniform characteristics in time.

Only when a UE is synchronized with a BS, the UE may transmit a UL signal and may be scheduled for data transmission. A main role of an RACH is radio access in a transmission scheme that makes asynchronous UEs orthogonal to one another or prevents coincident accesses of the UEs as much as possible. The RACH will be described in greater detail.

Regarding the usage and requirements of the RACH, a main function of the RACH is UL initial access and short message transmission. Although initial network access and short message transmission take place on the RACH in a Wideband Code Division Multiple Access (WCDMA) system, short message transmission is not performed through the RACH in the LTE system. In addition, the RACH is transmitted separately from an existing UL data channel in the LTE system, compared to the WCDMA system. That is, while a UL data channel, PUSCH has a symbol structure with a basic subcarrier spacing $\Delta f$ set to 15 kHz, the RACH has an SC-FDMA structure with a subcarrier spacing $\Delta f_{RA}$ set to 1.25 kHz. Once UL synchronization is acquired between a BS and a UE, the UE is scheduled for orthogonal resource allocation and transmission in the LTE system.

Figure 7:
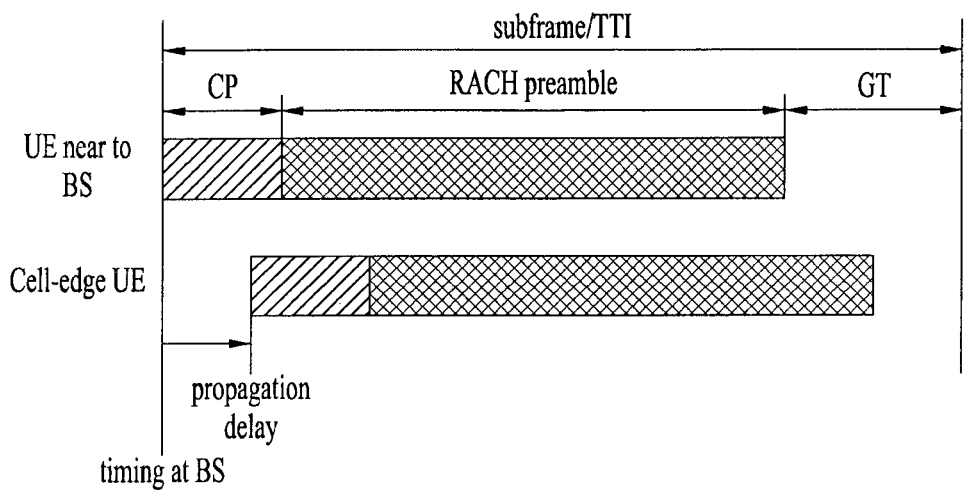
FIG. 7 illustrates a structure of a Random Access Channel (RACH) preamble.

The structure of an RACH preamble will be described below. FIG. 7 illustrates a structure of an RACH preamble.

Referring to FIG. 7, an RACH preamble includes a Cyclic Prefix (CP), a preamble sequence, and a Guard Time (GT). The CP is used to compensate for a maximum channel delay spread and a Round Trip Time (RTT), and the GT is used to compensate for the RTT. The CP is a copy of the last part of an OFDM symbol, inserted into the CP period of the preamble.

On the assumption that it has been synchronized with a BS, a UE transmits an RACH preamble to the BS. If the UE is near to the BS, the BS receives the RACH almost in alignment with a subframe boundary. On the other hand, if the UE is remote from the BS, for example, the UE is at a cell edge, the BS receives the RACH later than a nearby UE's RACH due to a propagation delay. Because the BS has knowledge of a preamble sequence transmitted by each UE, the BS may perform a synchronization process based on the detected position of the preamble transmitted by each UE.

Many sequences are available for an RACH preamble. For example, a Zadoff-Chu (ZC) sequence based on auto-correlation and a pseudorandom sequence based on cross-correlation are popular. In general, the ZC sequence based on auto-correlation may be selected in a low intra-cell interference environment and the pseudorandom sequence based on cross-correlation may be selected in a high intra-cell interference environment.

In the LTE system, 1) the intra-cell interference between different preambles using the same time-frequency RACH resources should be low; 2) since detection performance increases with the use of more orthogonal preambles, the detection performance of a BS should be increased by defining more orthogonal preambles for a smaller cell; 3) the detection complexity of the BS should be reduced; and 4) a fast UE should also be supported. To meet the above requirements, the LTE system uses a ZC sequence of length 839 expressed as [Equation 1], for an RACH preamble.

$$x_u(n) \cdot = e^{-j\frac{\pi u n(n+1)}{N_{zc}}}, \quad 0 \leq n \leq N_{zc} - 1(N_{zc} = 839) \quad \text{[Equation 1]}$$

However, if the intra-cell interference is high, a pseudo-random sequence expressed as [Equation 2] may be used for an RACH preamble.

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

$$c(n) = (x_1(n+N_c) + x_2(n+N_c)) \bmod 2 \quad \text{[Equation 2]}$$

Now, a description will be given of a transmission bandwidth for an RACH preamble. Two main factors taken into account in setting an RACH bandwidth are diversity gain and restriction of UE transmission power. Since a UE has limited power amplifier performance relative to a BS, energy per resource unit is decreased but frequency diversity is maximized by transmitting an RACH in a wide frequency band. On the contrary, if an RACH preamble is transmitted in a narrow frequency band, energy per resource unit is increased but frequency diversity is minimized.

When an LTE RACH transmission bandwidth is determined actually, 1.08 MHz, 2.16 MHz, 4.5 MHz, and 50 MHz (having 6 RBs, 12 RBs, 25 RBs, and 50 RBs, respectively) are candidates. Since it is revealed from a comparison of RACH non-detection probabilities that 6 RBs is enough to satisfy a non-detection probability of 1%, 1.08 MHz is determined as a final RACH transmission bandwidth.

The length of an RACH preamble sequence will be described now. To determine the length $T_{SEQ}$ of an RACH preamble sequence, conditions for the low and upper bounds of the sequence length $T_{SEQ}$ and a subcarrier spacing should be satisfied.

The lower bound of the sequence length $T_{SEQ}$ should be larger than the sum of the RTT and maximum channel delay spread of a cell-edge UE within coverage in order to eliminate detection ambiguity. That is, [Equation 3] should be satisfied.

[Equation 3]

$$T_{SEQ} \geq \frac{2 \cdot d_{long}}{3 \times 10^8} + \tau_{max} \quad \text{condition \#1}$$

In [Equation 3], $d_{long}$ represents the service coverage and $\tau_{max}$ represents the maximum channel delay spread. For example, it is assumed that the largest cell has a radius of 100 km and the maximum channel delay spread of the cell is 16.67 μs in the LTE system. It is also assumed that service coverage in a high carrier frequency is 3 km and the maximum channel delay spread of the high carrier frequency is 0.5 μs. On these assumptions, the following [Equation 4] and [Equation 5] are given.

$$T_{SEQ} \geq \frac{2 \cdot 100 \text{ km}}{3 \times 10^8} + 16.67 \text{ us} = 683.33 \text{ us} \quad \text{[Equation 4]}$$
- LTE case $$T_{SEQ} \geq \frac{2 \cdot 3 \text{ km}}{3 \times 10^8} + 0.5 \text{ us} = 40.5 \text{ us} \quad \text{[Equation 5]}$$
- High carrier frequency case If the upper bound of the sequence length $T_{SEQ}$ is determined in conformance to a general frame standard, the upper bound cannot exceed a given Transmission Time Interval (TTI). If a subframe is 1 ms long as in the LTE system, the TTI is 1 ms. Herein, a maximum sequence period is based on the assumption of service coverage in which a UE is nearest to a BS and the maximum channel delay spread is 0 μs. Accordingly, condition #2 expressed as [Equation 6] should be satisfied.

[Equation 6]

$$T_{SEQ} \leq TTI - 2 \times \frac{2 \cdot d_{short}}{3 \times 10^8} \quad \text{Condition \#2}$$

In [Equation 6], $d_{short}$ represents the service coverage in which a UE is nearest to a BS. For example, $d_{short}$ is 14.4 km in the LTE system and $d_{short}$ is 1 km in the high carrier frequency. If the TTI is 222 ms in the high carrier frequency, [Equation 7] and [Equation 8] are resulted.

$$T_{SEQ} \leq 1 \text{ ms} - 2 \times \frac{2 \cdot 14.4 \text{ km}}{3 \times 10^8} = 813 \text{ us} \quad \text{[Equation 7]}$$
- LTE case $$T_{SEQ} \leq 222 \text{ ms} - 2 \times \frac{2.1 \text{ km}}{3 \times 10^8} = 208.3 \text{ us} \quad \text{[Equation 8]}$$
- High carrier frequency case Finally, a requirement for the RACH subcarrier spacing $\Delta f_{RA}$ will be described below.

If a sampling frequency $N_{DFT}$ being the reciprocal of the sequence length $T_{SEQ}$ is in the relationship that $N_{DFT} = f_s \cdot T_{SEQ}$ maximum orthogonality is ensured between UL subcarriers of an existing frame and RACH subcarriers. Because the subcarrier spacing $\Delta f$ of the existing frame should be an integer multiple of the RACH subcarrier spacing $\Delta f_{RA}$, condition #3 given as [Equation 9] should be satisfied.

[Equation 9]

$$\Delta f_{RA} = \frac{f_s}{N_{DFT}} = \frac{1}{T_{SEQ}} = \frac{1}{k \cdot T_{SYM}} = \frac{\Delta f}{k} \quad \text{Condition \#3}$$

In this case, the RACH subcarrier spacing $\Delta f_{RA}$ is determined in the LTE system by the following equation.

$$\Delta f_{RA} = \frac{30.72 \text{ MHz}}{2048} = \quad \text{[Equation 10]}$$

$$= \frac{1}{800 \text{ us}} = \frac{1}{12 \cdot 66.67 \text{ us}} = \frac{15 \text{ kHz}}{12} = 1.25 \text{ kHz}$$

Hereinbelow, an exemplary setting of an RACH preamble period for RACH transmission in a high carrier frequency, satisfying condition #1, condition #2, and condition #3 will be described. For a minimum service coverage of 1 km and a maximum service coverage of 3 km, an RTT is calculated and a maximum channel delay spread of 0.5 μs is considered.

TABLE 1

| Coverage | RTT (GP) | CP for RACH (RTT + 0.5 us) | GP + CP | TTI candidate | TTI − (GP + CP) Sequence duration |
|---|---|---|---|---|---|
| 1 km(short) | 6.6 us | 7.1 us | 13.7 us | 222 us | 208.3 us |
|  |  |  |  | 767 us | 754.3 us |
|  |  |  |  | 125 us | 111.3 us |
| 3 km(long) | 20.0 us | 20.5 us | 40.5 us | 222 us | 181.9 us |
|  |  |  |  | 767 us | 726.9 us |
|  |  |  |  | 125 us | 84.9 us |

If the service coverage is 3 km and the TTI is 222 μs, an RACH preamble period and a CP are calculated by [Table 2].

TABLE 2

$k = \Delta f/\Delta f_{RA} = 18 \le \lfloor T_{SEQ}/T_{SYM} \rfloor = \lfloor 181.9 \text{ us}/(1/104.25 \text{ kHz}) \rfloor = 18$
$\Delta f_{RA} = \Delta f/k = 104.24 \text{ kHz}/18 = 5.7917 \text{ kHz}$
$T_{SEQ} = 1/\Delta f_{RA} = 172.66 \text{ us}$
$T_{CP} = 20.5 \text{ us}$ As noted from [Table 3] below, condition #1, condition #2, and condition #3 are all satisfied with the calculated sequence length $T_{SEQ}$=172.66 us.

TABLE 3

Figure 8:
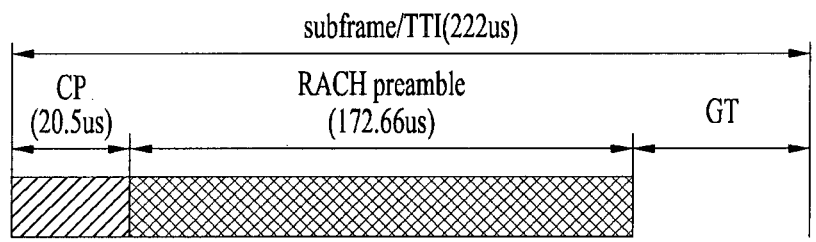
FIG. 8 illustrates an exemplary setting of a Cyclic Prefix (CP) and a transmission period for an RACH preamble to transmit the RACH preamble in a high carrier frequency.

Condition #1: $T_{SEQ} = 172.66 \text{ us} \ge \frac{2 \cdot 3 \text{ km}}{3 \times 10^8} + 0.5 \text{ us} = 40.5 \text{ us}$ Condition #2: $T_{SEQ} = 172.66 \text{ us} \le 222 \text{ ms} - 2 \times \frac{2 \cdot 3 \text{ km}}{3 \times 10^8} = 181.9 \text{ us}$ Condition #3: $\Delta f_{RA} = \Delta f/k = 104.24 \text{ kHz}/18 = 5.7917 \text{ kHz}$ Therefore, a final RACH preamble may be configured as illustrated in FIG. 8. FIG. 8 illustrates an exemplary setting of a CP and a transmission period for an RACH preamble, for RACH preamble transmission in a high carrier frequency. In the illustrated case of FIG. 8, the service coverage is 3 km and the TTI is 222 μs.

In another example, if the service coverage is 1 km and the TTI is 125 μs, the values illustrated in [Table 4] may be calculated.

TABLE 4

$k = \Delta f/\Delta f_{RA} = 12 \le \lfloor T_{SEQ}/T_{SYM} \rfloor = \lfloor 111.3 \text{ us}/(1/120 \text{ kHz}) \rfloor = 13$
$\Delta f_{RA} = \Delta f/k = 120 \text{ kHz}/12 = 10 \text{ kHz}$
$T_{SEQ} = 1/\Delta f_{RA} = 100 \text{ us}$
$T_{CP} = 7.1 \text{ us}$ As noted from [Table 5] below, condition #1, condition #2, and condition #3 are all satisfied with the calculated sequence length $T_{SEQ}$=100 us.

TABLE 5

Figure 9:
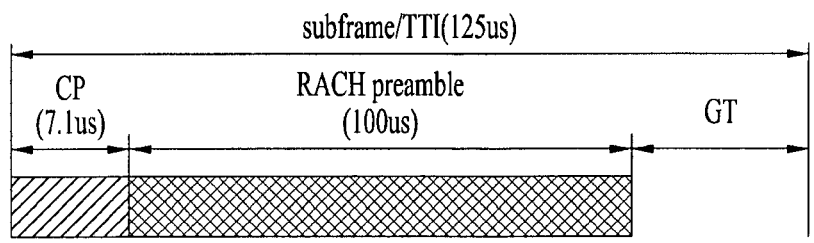
FIG. 9 illustrates another exemplary setting of a CP and a transmission period for an RACH preamble to transmit the RACH preamble in a high carrier frequency.

Condition #1: $T_{SEQ} = 100 \text{ us} \ge \frac{2 \cdot 1 \text{ km}}{3 \times 10^8} + 0.5 \text{ us} = 7.1 \text{ us}$ Condition #2: $T_{SEQ} = 100 \text{ us} \le 125 \text{ ms} - 2 \times \frac{2 \cdot 1 \text{ km}}{3 \times 10^8} = 111.3 \text{ us}$ Condition #3: $\Delta f_{RA} = \Delta f/k = 120 \text{ kHz}/12 = 10 \text{ kHz}$ Therefore, a final RACH preamble may be configured as illustrated in FIG. 9. FIG. 9 illustrates another exemplary setting of a CP and a transmission period for an RACH preamble, for RACH preamble transmission in a high carrier frequency. In the illustrated case of FIG. 9, the service coverage is 1 km and the TTI is 125 μs.

To verify whether a target area of a sequence satisfying condition #1, condition #2, and condition #3 is appropriately designed, link budget parameters listed in [Table 6] may be used.

TABLE 6

| Parameter | LTE value | Higher Carrier Band |
|---|---|---|
| Carrier frequency($f_c$) | 2 GMHz | 30 GHz |
| eNB antenna height($h_b$) | 30 m/60 m | 10 m(3 GPP 36.814 UMI) |
| UE antenna height($h_m$) | 1.5 m | 1.5 m |
| UE transmit Power($P_{max}$, EIRP) | 24 dBm(250 mW) | 24 dBm |
| eNB receiver Ant. Gain ($G_a$) | 14 dBi | 14 dBi |
| Receiving Noise Figure($N_f$) | 5 dB | 5 dB |
| Thermal Noise Density($N_0$) | −174 dBm/Hz | −174 dBm/Hz |
| Required ($E_p/N_0$) | 18 dB | 18 dB |
| Penetration loss (PL) | 0 dB | 0 dB(outdoor) |
| Log-normal fading margin(LF) | 0 dB | 0 dB(outdoor) |
| PL model(L(d))[dB] | Okumura-Hata (Suburban areas) | LMDS channel model (Good, Bad) + Margin w.r.t height |
| Target coverage(d)[km] | About 14 km | 3 km(RTT = 19.8 us) |

The target area of the sequence is finally verified by [Equation 11].

$$T_{SEQ} = \frac{N_0 N_f}{P_{RA}(d)} \frac{E_P}{N_0} \quad \text{[Equation 11]}$$

[Equation 11] is expressed as a function of distance d by which an appropriate effective distance may be estimated. A verification example regarding an LTE case and a high carrier frequency case with a service coverage of 3 km and a TTI of 222 μs will be described below. It is assumed that the maximum channel delay spread is 0.5 μs.

A path loss function $P_{RA}(d)$ in [Equation 11] may be represented as [Equation 12], in terms of dB.

$$P_{RA}(d) = P_{max} + G_a - L(d) - LF - PL(\text{dB}) \quad \text{[Equation 12]}$$

A substantial path loss is expressed as a function L(d) in [Equation 12]. An Okumura-Hata model applies in designing an RACH in the LTE system.

Figure 10:
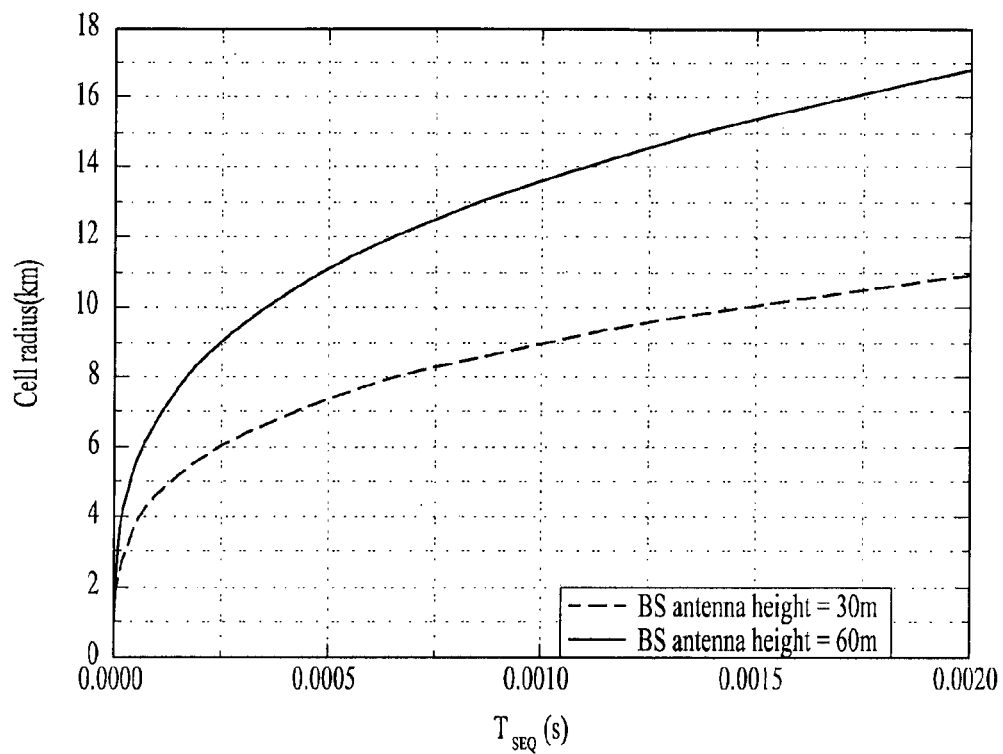
FIG. 10 is a graph illustrating RACH sequence length versus service coverage in the LTE system.

FIG. 10 is a graph illustrating RACH sequence length versus service coverage in the LTE system. Particularly, a suburban situation of the Okumura-Hata model is taken in FIG. 10. Referring to FIG. 10, it is noted that if a BS height is 60 m at a point where the sequence length $T_{SEQ}$ is 1 ms, the service coverage is about 14 km.

Figure 11:
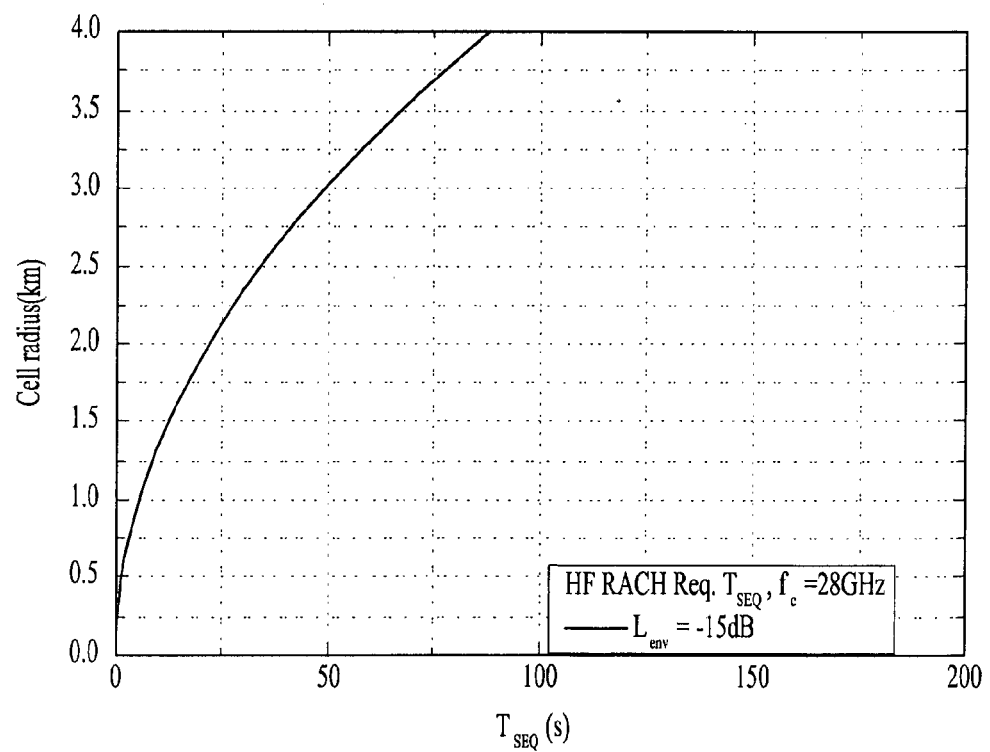
FIG. 11 is a graph illustrating RACH sequence length versus service coverage in a high carrier frequency system.

For verification in the high carrier frequency case, a Local Multipoint Distribution. Services (LMDS) model applies to the path loss function L(d). FIG. 11 is a graph illustrating RACH sequence length versus service coverage in the high carrier frequency system. Referring to FIG. 11, it is noted that a service coverage with a sequence length $T_{SEQ}$ of 111.3 µs is appropriately 14 km, far larger than a target coverage of 3 km.

As described above, an RACH transmission period may vary with a service coverage and a TTI. In addition, to maintain orthogonality with an existing OFDM frame, an RACH subcarrier spacing should be an integer multiple of an existing subcarrier spacing. This means that the RACH subcarrier spacing gets shorter in the frequency domain and an RACH OFDM symbol having a longer period than an existing OFDM symbol period is set in the time domain. That is, an RACH OFDM symbol is designed to be k times longer than an existing OFDM symbol based on the relationship that $\Delta_{RA}=\Delta f/k$.

In the present invention, an RACH sequence length is determined based on the relationship between an OFDM symbol period and an RACH OFDM symbol period.

In this specification, a method of determining an RACH effective sequence length when an RACH transmission band of a UE is given is described. In consideration of amplifier power of the UE, it is most possible to basically transmit the RACH in a partial band smaller than a frequency band of an overall system. In addition, a subcarrier spacing of the RACH is smaller than that of a general data channel (that is, $\Delta_{RA}=\Delta f/k$) and thus an RACH symbol having a longer period may be transmitted in the time domain.

In the present invention, when the RACH transmission band of the UE is given, a final effective sequence length is determined by sequentially considering the following factors. Specifically, a method for design of an RACH for substantial high carrier frequency transmission will be described in detail with regard to an example considering center frequency-based path loss models for high carrier frequency band transmission.

Reference signal to noise ratio of RACH channel
Reference signal to noise ratio of data channel
Path loss model (general cellular band and high carrier frequency band (>10 GHz))
RACH reception request signal to noise ratio of BS
RACH transmission band
Sequence type (Poly-phase sequence and m-sequence)

1. Method for Determining RACH Preamble Sequence Length

Basically, an RACH is managed in unsynchronization with uplink and thus is detected based on correlation characteristics of sequences without channel estimation. Timing advance (TA) may also be managed based on this correlation.

With regard to an RACH sequence managed according to the correlation characteristics, a sequence with excellent autocorrelation characteristics or excellent cross correlation characteristics may be selected and applied according to its interference characteristics. In general, when intra-cell interference is low, it is advantageous to use a poly-phase sequence with excellent autocorrelation characteristics, such as a Zadoff-Chu (ZC) sequence. When intra-cell interference is high, it is advantageous to use an m-sequence such as a pseudo-random sequence.

In general, on the assumption that an RACH preamble uses lower transmission power than general data, summation of transmission power is used via increase in sequence length in order to increase RACH detection accuracy due to the low transmission power. Thus, signal to noise ratio (SNR) compensation using a sequence length is calculated according to [Equation 13] below and is defined as an adjusting value. For example, when a sequence length is 1,000, an adjusting value is 30 dB, and it may be deemed that an RACH signal SNR, which is actually detected by a UE, increases by about 30 dB.

$$\text{Adjusting Value}=10 \cdot \log_{10}(\text{SequenceLength}) \quad \text{[Equation 13]}$$

As a result, when the RACH sequence length is set, the RACH sequence length may vary according to requirements for restricting a range of the adjusting value to a predetermined region. In general, $E_p/N_0$ that is an actual SNR of the RACH is given as a relative value. That is, it is assumed that the UE transmits an RACH signal with a lower specific value having DB as a unit, than $E_s/N_0$ as an SNR of a data transmission signal detected by the BS from the UE at a target position. In general, it is assumed that $E_p/N_0$ is lower than $E_s/N_0$ by 24 dB. In other words, this means that it is assumed that $E_p/N_0=E_s/N_0-24$ dB.

Hereinafter, on the aforementioned assumption, processes of calculating the RACH sequence length will be sequentially described.

(1) First Step: Calculation of Path Loss Based on Reference Point of UE

First, in order to calculate path loss, when the UE transmits a signal with maximum transmission power at a specific distance from the BS, path loss measured in the BS needs to be preferentially calculated. In general, a path loss function $P_s(d)$ is represented according to [Equation 14] below. Here, actual path loss is L(d) and other parameters may be given as follows.

$$P_s(d) = P_{max} + G_a - L(d) - LF - PL(\text{dB}) \quad \text{[Equation 14]}$$

$$\begin{cases} P_{max}(Tx \cdot \text{Power}) = 24 \ dBm = -6 \ dB \\ G_a(Rx \cdot Ant \cdot \text{Gain}) = 15 \ dBi \\ LF(\text{Shadowing}) = 0 \ dB \\ PL(\text{PenetrationLoss}) = 0 \ dB \\ L(d): \text{Path} - \text{loss} \end{cases}$$

For example, the LTE case assumes an RACH with d=0.68 km and calculates path loss using the Okumura-Hata path loss model. The high carrier frequency case assumes an LDMS model represented by [Equation 15] below and a distance d=0.3 km. In both the cases, other parameters are shown in [Table 6] above.

$$P_s(d)=P_{max}+G_\alpha-32.44-20 \log_{10}(f_{c,GHz} \cdot d_m)- L_{exv}\{L_{env}=15 \text{ db} \quad \text{[Equation 15]}$$

In this case, path loss in a data signal received by the BS is 123.8 dB in the LTE case and 118.5 dB in the high carrier frequency case due to different amplitudes of center frequencies and different path loss models.

(2) Second Step: Calculation of Amplitude of Noise Signal According to RACH Allocation Band In general, a final value may be calculated according to a transmission band of an RACH on the assumption of noise as $N_0(=-174 \text{ dBm/Hz})$. For example, it is assumed that the RACH is allocated to 1.08 MHz in the LTE case and 5 MHz in the high carrier frequency case. In this case, the amplitudes of noise signals are calculated according to [Equations 16] below.

$$N_{0.108\ MHz} = -204\ dB + 10\ \log_{10}(1.08\ MHz) = -143.7\ dB\text{-LTEcase}$$

$$N_{0.5\ MHz} = -204\ dB + 10\ \log_{10}(5\ MHz) = -137\ dB\text{-High carrier frequencycase}$$ [Equation 16]

(3) Third Step: Calculation of Reference $E_s/N_0$ for General Data Transmission A final $E_s/N_0$ is calculated according to [Equation 17] below. In this case, since the path loss and the noise signal amplitude are calculated in the first and second steps, the noise figure of a receiver is lastly considered.

$$\frac{E_s}{N_0} = \frac{P_s(d)}{N_0 N_f} = P_s(d) - N_f - N_0(dB)$$ [Equation 17]

For example, on the assumption of $N_f=5$ dB, $E_s/N_0$ of each of the LTE case and the high carrier frequency case may be represented according to [Equation 18] below.

$$\frac{E_s}{N_0} =$$ [Equation 18]

$$P_s(d) - N_f - N_0 = -123.8 - 5 - (-143.7) = 14.9\ dB$$

-LTE case $$\frac{E_s}{N_0} = P_s(d) - N_f - N_0 = -118.5 - 5 + 137 = 13.5\ dB$$

-High carrier frequency case (4) Fourth Step; Calculation of Final $E_p/N_0$ of RACH In a fourth step, it is assumed that an RACH reception signal to noise ratio is lower than a data reception signal to noise by about 24 dB. For example, the LTE case and the high carrier frequency case of [Table 6] acquire $E_p/N_0$ according to [Equation 19] below.

$$\frac{E_p}{N_0} = \frac{E_s}{N_0} - 24\ dB = 14.9 - 24 = -9.1\ dB$$ [Equation 19]

-LTE case $$\frac{E_p}{N_0} = \frac{E_s}{N_0} - 24\ dB = 13.5 - 24 = -10.5\ dB$$

-High carrier frequency case (5) Fifth Step: Calculation of Required RACH Sequence Length to Satisfy $E_p/N_0$ As described above, SNR compensation using the RACH sequence length is possible, which is achieved using sequence energy summation based on correlation. Thus, lastly, a value satisfying [Equation 20] below may be acquired. That is, an adjusting RACH sequence length for satisfying $E_p/N_0$ calculated in the fourth step may be calculated.

$$\text{Required}\frac{E_p}{N_0} = \frac{E_p}{N_0} + 10\log_{10}(SequenceLength)$$ [Equation 20]

In reality, in the LTE case, the RACH sequence length is calculated on the assumption of $E_p/N_0=-11$ dB and Required $E_p/N_0=18$ dB, and in the high carrier frequency case, the RACH sequence length is calculated on the assumption of the aforementioned $E_p/N_0=-10.5$ dB. In this case, the RACH sequence length is 839 in the LTE case and 707.9 in the high carrier frequency case.

(6) Sixth Step: Determination of Final Sequence Length

Basically, in order to satisfy the adjusting value, the same or larger value than the calculated required sequence length is needed. However, one factor needs to be additionally considered. An RACH and a general data channel have different subcarrier intervals and thus guard bands need to be allocated to opposite ends of a frequency band, to which the RACH channel is allocated, in order to ensure the orthogonality between the RACH and the data channel.

Figure 12:
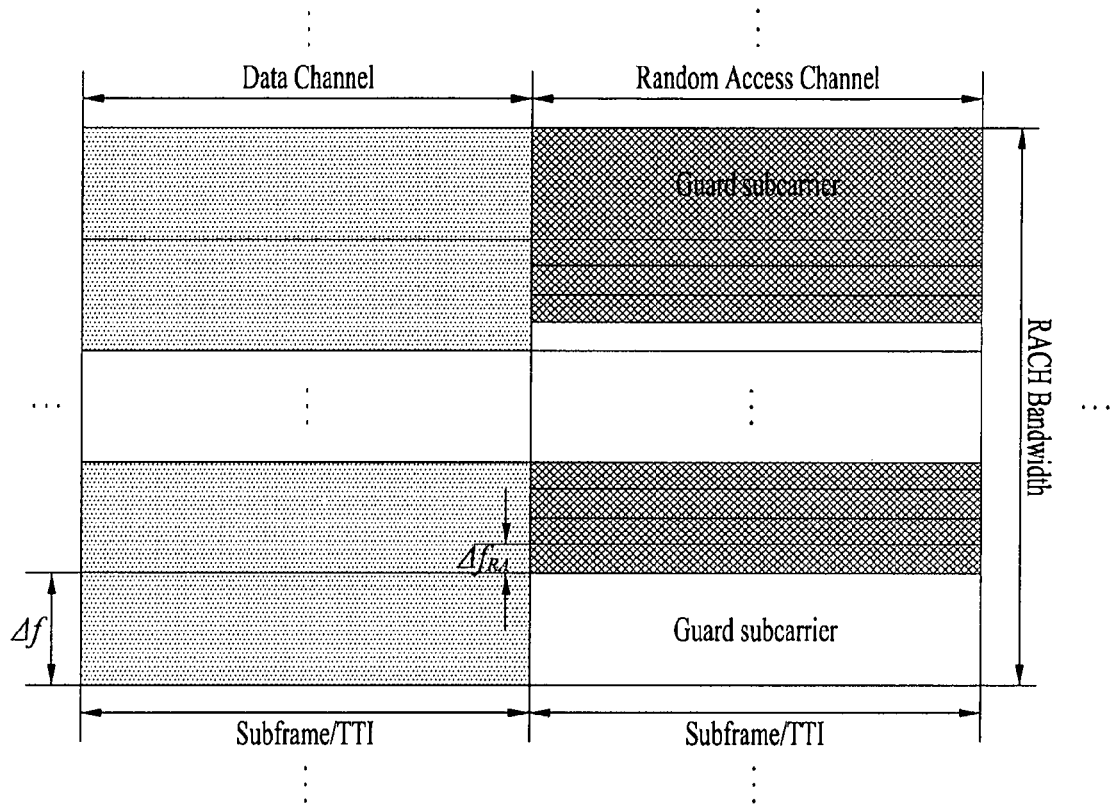
FIG. 12 illustrates the concept of an RACH allocated to a partial band and configuration of guard bands.

FIG. 12 illustrates the concept of an RACH allocated to a partial band and configuration of guard bands.

Referring to FIG. 12, the orthogonality between two channels is ensured by configuring guard bands at subcarrier intervals of data channels. Accordingly, [Equation 21] below needs to be satisfied.

$$SequenceLength + 2 \times k \le \lfloor BW_{RA}/(\Delta f/\Delta f_{RA})\rfloor$$ [Equation 21]

$$\left\{k = \frac{\Delta f}{\Delta f_{RA}}\right.$$

In [Equation 21] above, k refers to a guard band. In the LTE case, a ZC sequence is used for RACH design, the guard band is set as 31.25 kHz>2·$\Delta$f, and a final sequence length is 839 that is a prime number.

As another example, in the high carrier frequency case, the required sequence length calculated in the fifth step needs to be 707.9 or more. Accordingly a final value is calculated according to [Equation 22] below. Here, an RACH transmission band is assumed as 5 MHz.

$$SequenceLength + 2 \times k \le \lfloor BW_{RA}/(\Delta f/\Delta f_{RA})\rfloor = 828$$ [Equation 22]

A last factor to be considered to determine the last adjusting value is a sequence type. For example, when the RACH sequence is a ZC sequence, a prime number satisfying 'Max prime number≤sequence-length' is selected. In addition, when the RACH sequence is a PN sequence, the calculated sequence length can be used.

Accordingly, in the high carrier frequency case, since a largest prime number among prime numbers satisfying a sequence length, 828 is 827, the sequence is 827 in case of the ZC sequence, and is 828 in case of the PN sequence.

2. Method of Configuring Zero-Correlation Zone of RACH Sequence in Consideration of Characteristics of High Carrier Frequency In the LTE system, a subcarrier interval $\Delta f_{RA}$ of an RACH is set to be about $\frac{1}{12}$ times lower than a subcarrier interval $\Delta f$ of an existing data channel when an RACH sequence is designed. Accordingly, lastly, in the LTE system, a basic subcarrier interval satisfies $\Delta f=15$ kHz and $\Delta f_{RA}=1.25$ kHz.

In the high carrier frequency system, when a subcarrier interval is set to be smaller than a basic subcarrier interval, influence on a Doppler's frequency may be further increased degrading detection performance. For example, in the high carrier frequency case using 30 GHz as a center frequency, a UE with the same movement speed may lead to a Doppler effect 15 times higher than a case of 30 GHz. Accordingly, in the RACH for a high carrier frequency band, when an amplitude of $\Delta f_{RA}$ is reduced as in the legacy LTE, performance may be greatly degraded.

In general, as an amplitude of $\Delta f_{RA}$ is reduced, the number of channel taps corresponding to an effective channel is one. Thus, on the assumption that the number of effective multiple paths of a channel is one, a BS may measure correlation between RACH sequences transmitted from UEs to identify each UE or estimate timing difference.

However, the RACH subcarrier interval needs to be the same as the basic subcarrier interval in consideration of the Doppler effect of a high carrier frequency channel, and thus, the channel tap of the effective channel cannot be assumed as a single tap, which will be described with reference to drawings.

Figure 13:
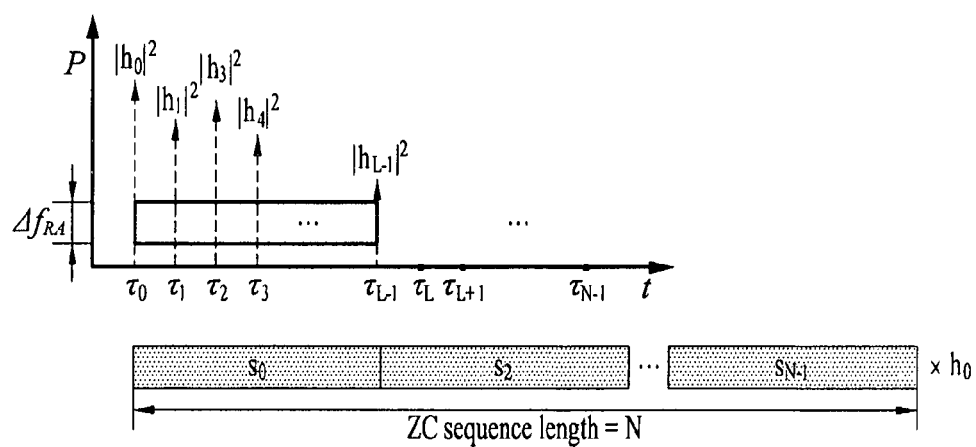
FIG. 13 illustrates the concept of an effective single path due to small $\Delta f_{RA}$ and sequence reception of a BS.
Figure 14:
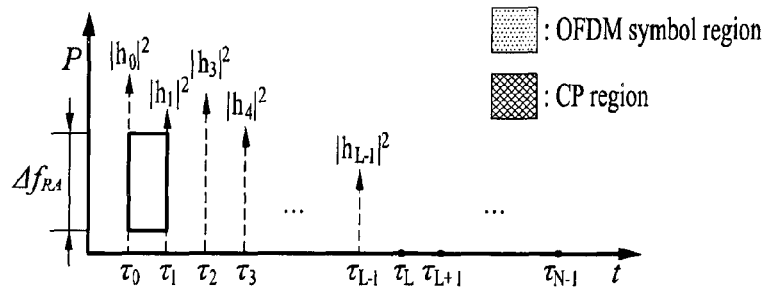
FIG. 14 illustrates the concept of an effective single path due to great $\Delta f_{RA}$ and sequence reception of a BS.
Figure 14:
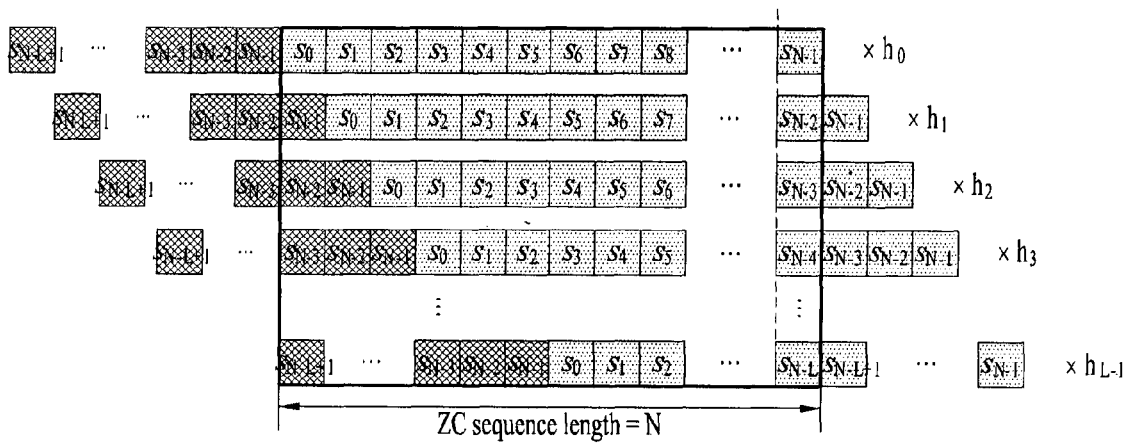

FIG. 13 illustrates the concept of an effective single path due to small $\Delta f_{RA}$ and sequence reception of a BS. FIG. 14 illustrates the concept of an effective single path due to great $\Delta f_{RA}$ and sequence reception of a BS.

As illustrated in FIG. 13, when an RACH with a relatively small subcarrier interval $\Delta f_{RA}$ transmits ZC sequences $s_0$, $s_1$, $s_2$, $s_3$, . . . , $s_{N-1}$, the length of a transmission symbol is increased on the time axis, and thus, an effective channel section is assumed to be a single tap. However, as illustrated in FIG. 14, when an RACH with a relatively great subcarrier interval $\Delta f_{RA}$ transmits ZC sequences $s_0$, $s_1$, $s_2$, $s_3$, . . . , $s_{N-1}$, the length of a transmission symbol is reduced on the time axis, and thus, an effective channel section is shown as a multiple path. Accordingly, correlation between sequences needs to be performed by as much as overlap between each sequence sample section of the RACH and L multiple paths.

It may be ensured that a first channel tap $h_0$ of the multiple paths is selected. That is, $h_1$, $h_2$, $h_3$, . . . , $h_{L-1}$ may be selected, which may lead to reduction in performance when a value for timing advance (TA) of uplink is accurately estimated. Thus, the present invention proposes configuration of a zero-cross correlation zone of each UE when an RACH for a high carrier frequency is designed.

(A) First, configuration of a zero-cross correlation zone of a ZC sequence in consideration of an RACH subcarrier interval and a maximum delay profile may be considered.

That is, when maximum channel time of a channel is $\tau_{Max}$, time axis samples may be formed by as much as the number obtained by dividing $\tau_{Max}$ by a sampling time, and an RACH sequence may be received by the BS through multiple path channels, the number of which corresponds to the time axis samples. The ZC sequence is represented according to [Equation 23] below.

$$s_u(n) \cdot = e^{-j\frac{\pi u n(n+1)}{N}}, \; 0 \leq n \leq N-1 \; (N = SequenceLength) \quad \text{[Equation 23]}$$

In Equation 23 below, u refers to a root value and N refers to a sequence length.

In this case, cyclic shift corresponding to a specific length may be used to allocate a sequence to multiple users, which may be used to identify various users using one sequence or to perform timing advance (TA). This will be described with reference to drawings.

Figure 15:
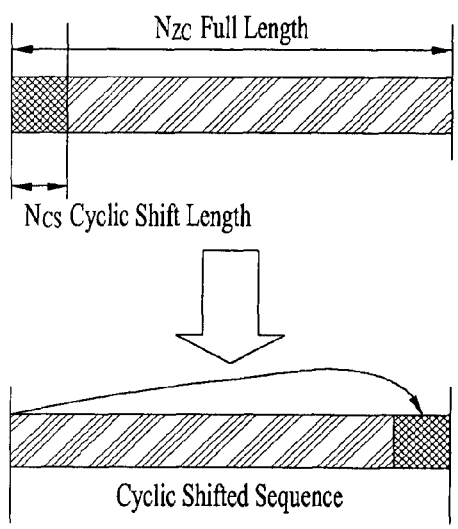
FIG. 15 illustrates a cyclic shift principle using a Zadoff-Chu (ZC) sequence.
Figure 16:
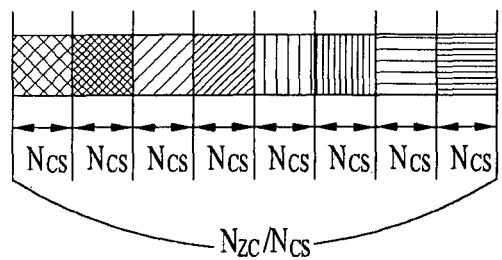
FIG. 16 illustrates the concept of allocation of a multiple user sequence using cyclic shift.
Figure 17:
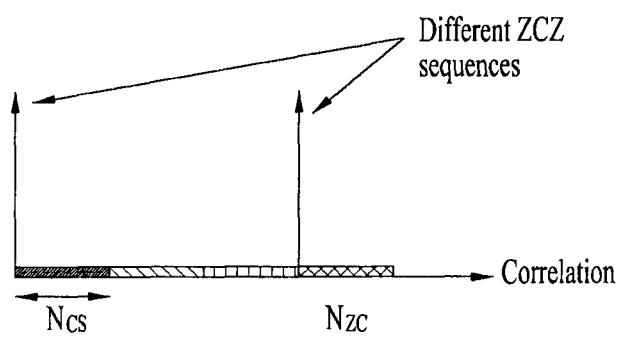
FIG. 17 illustrates an example of user detection in different zero-correlation zones.

FIG. 15 illustrates a cyclic shift principle using a ZC sequence. FIG. 16 illustrates the concept of allocation of a multiple user sequence using cyclic shift. FIG. 17 illustrates an example of user detection in different zero-correlation zones.

As illustrated in FIG. 15, despite the same ZC sequence, the ZC sequence is orthogonal to a cyclically-shifted sequence. Thus, as illustrated in FIG. 16, when a cyclic shift section is divided and allocated to users, a BS may measure correlation between ZC sequences received at the same time to differentiate UEs or to estimate a delay point. Thus, as illustrated in FIG. 17, different zero-correlation zones may be configured to detect users.

Hereinafter, consideration of the RACH subcarrier interval $\Delta f_{RA}$ due to high carrier frequency characteristics and a maximum delay time $\tau_{Max}$ when the zero-correlation zone is configured using the aforementioned ZC sequence will be described.

First, the number L of samples of an effective channel section for configuration of the zero-correlation zone is calculated according to [Equation 24] below. That is, the number L of samples of the effective channel section is calculated to prevent the risk of detecting another signal of a user, formed by receiving a signal of a specific user via channel delay.

$$L = \left\lceil \frac{\tau_{Max}}{t_s} \right\rceil = \lceil \tau_{Max} \cdot \Delta f_{RA} \cdot N_{FFT} \rceil \; \text{or} \quad \text{[Equation 24]}$$

$$L = \left\lfloor \frac{\tau_{Max}}{t_s} \right\rfloor = \lfloor \tau_{Max} \cdot \Delta f_{RA} \cdot N_{FFT} \rfloor$$

$N_{FFT}$:FFT size

In [Equation 24] above, the zero-correlation zone is increased by as much as L that is the calculated number of samples of an effective channel. Thus, although a total number of users that can be identified via the same ZC sequence is reduced, the accuracy of user detection may be improved.

When an entire sequence length N is divided by a cyclic shift length $N_{CS}$, a total number of users may be calculated according to [Equation 25] below by applying L that is calculated via the aforementioned process.

$$\text{No. of users} = \left\lfloor \frac{N}{L + N_{CS}} \right\rfloor \quad \text{[Equation 25]}$$

Figure 18:
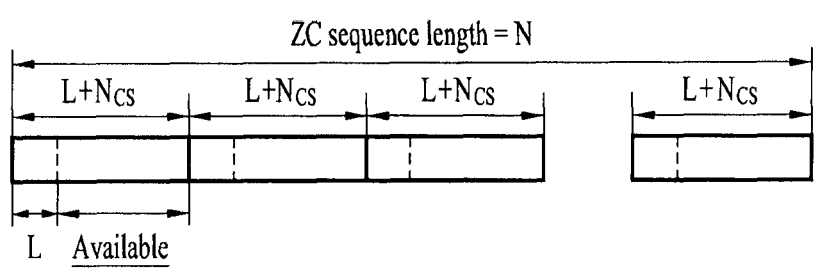
FIG. 18 illustrates an example of configuration of a zero-correlation zone in consideration of an effective channel section L according to an embodiment of the present invention.

In this case, a zero-correlation zone of a final ZC sequence is allocated according to [Equation 23] and [Equation 25] above. FIG. 18 illustrates an example of configuration of a zero-correlation zone in consideration of an effective channel section L according to an embodiment of the present invention.

As seen from FIG. 18, a point of time when a UE actually transmits a sequence is determined using only the number L of samples of the effective channel section of a total length L+$N_{CS}$, and a point of time for reception of a signal varies according to a position of the UE within the same value $N_{CS}$.

Even if UEs simultaneously transmits sequences, the sequences may be received at different points of time according to positions of the UE and BS, which will be described with reference to the drawings.

Figure 19:
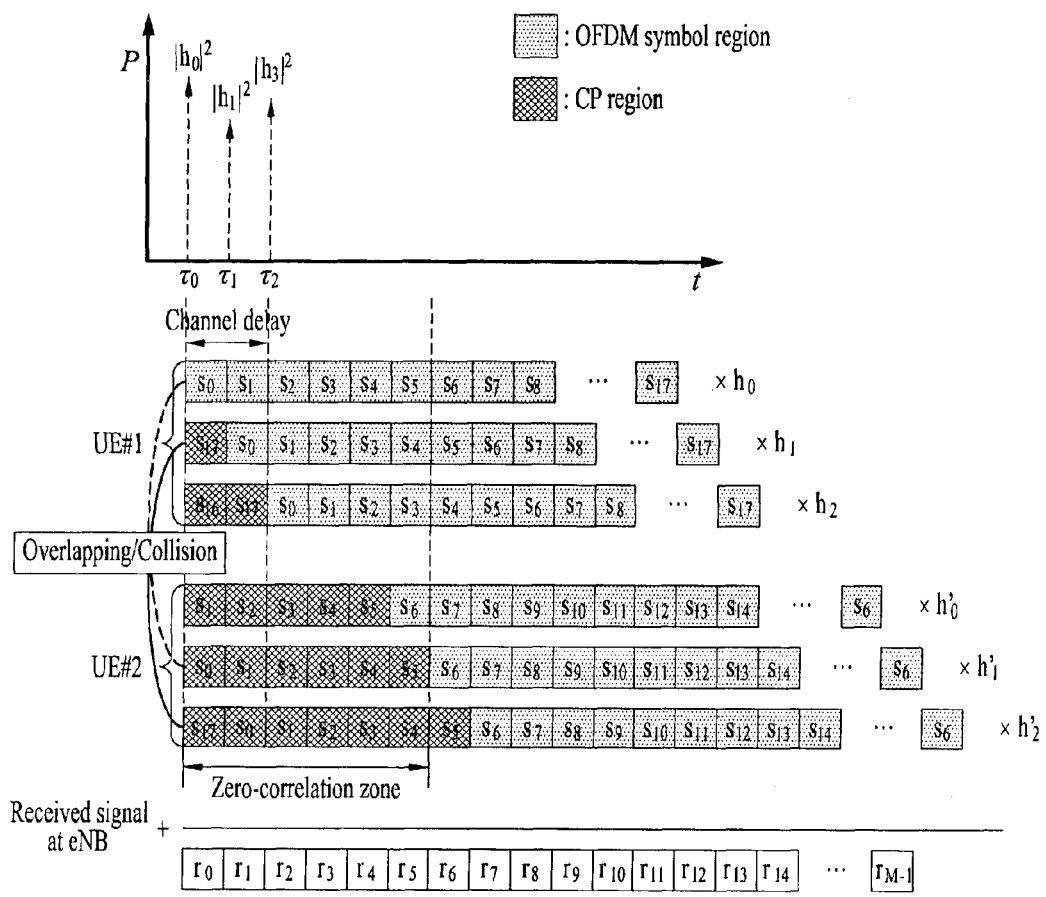
FIG. 19 illustrates sequence overlapping that occurs when an effective channel section L is not considered.
Figure 20:
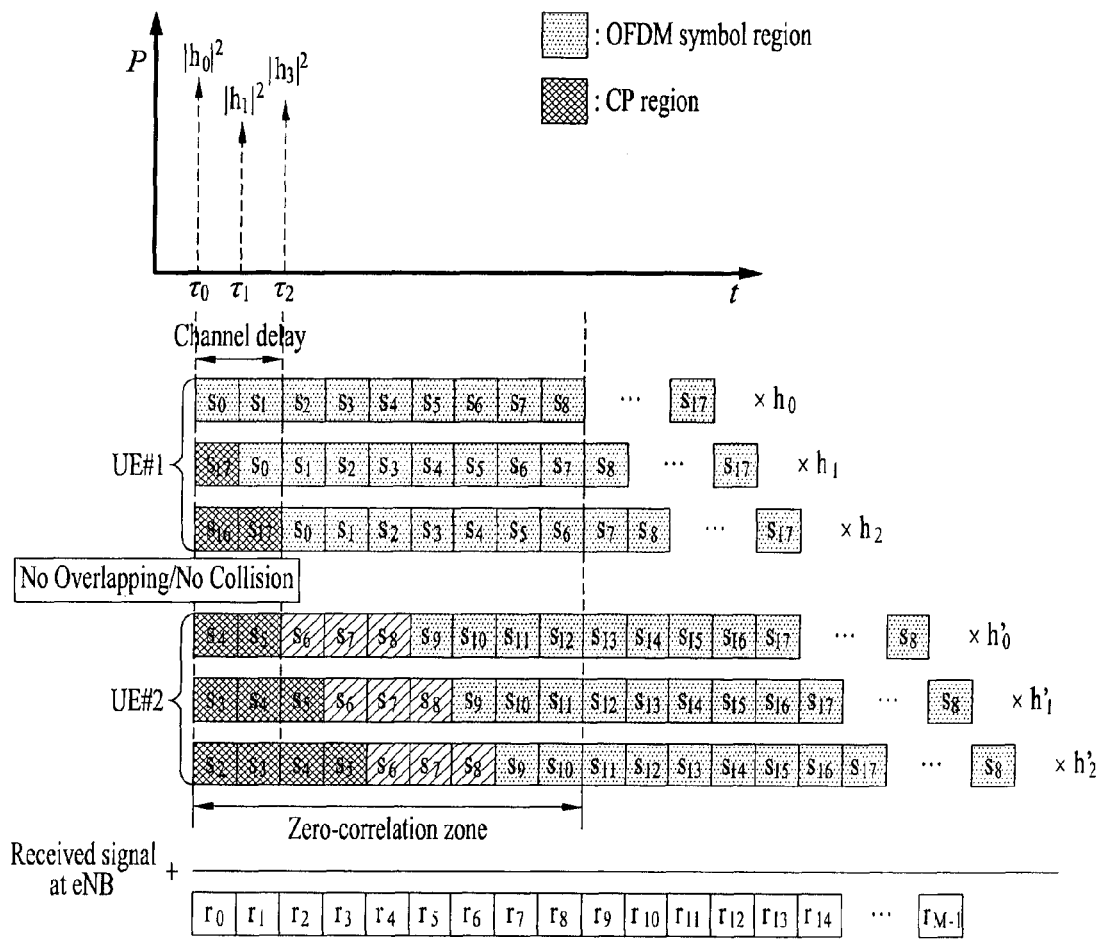
FIG. 20 illustrates an example of configuration of zero-correlation zone where sequence overlapping does not occur in consideration of the effective channel section L.

FIG. 19 illustrates sequence overlapping that occurs when an effective channel section L is not considered. In addition, FIG. 20 illustrates an example of configuration of zero-correlation zone where sequence overlapping does not occur in consideration of the effective channel section L. In particular, in FIGS. 19 and 20, it is assumed that a total sequence length N is 18 and a zero-correlation zone of each user is 6, and that the number of L of samples of an effective channel section according to channel delay is 3. In addition, it is assumed that a UE #1 using a zero-correlation zone #1 is close to a BS such that an RACH sequence reaches the BS at initial delay $\tau_0 = 0$ s.

When the number L of samples of the effective channel section is not considered, on the assumption that a sequence extremely reaches a UE #2 using a zero-correlation zone #2 at a last point of time of zero-correlation, a reception sequence of the UE #1 and the UE #2 is shown in FIG. 19. Thus, sequence overlapping degrades performance according to effective channel path delay, reducing sequence detection accuracy. On the other hand, it can be seen that, although the available cyclic shift number of a sequence configured with $L + N_{ZC} = 9$ is 2 that is smaller than 3 shown in FIG. 19, an overlapping region of the sequence is not present to increase detection accuracy, as illustrated in FIG. 20.

(B) Next, a method for configuring a zero-correlation zone of a ZC sequence in consideration of only a partial region of channel delay and a subcarrier interval of an RACH may be considered.

The aforementioned (A) describes a method for configuring a zero-correlation zone in consideration of all channel effective delay times. However, hereinafter, the present invention suggests a method for reflecting some of channel effective delay times. It is advantageous in that, when some of the channel effective delay times are reflected, the number of users that can be supported by the same sequence may be increased, compared with a case in which cyclic shift corresponding to the number L of samples of the effective channel section is not used.

i) First, various RACH formats to which different effective channel lengths are reflected may be configured, and a BS may indicate an RACH format that can be used by a UE via signaling.

When the BS defines various formats of RACH sequences and reception RACH delay of a user according to coverage of the user in a cell is extremely increased, UEs are notified of RACH formats to which the number L of samples of a maximum effective channel section is applied. In addition, when delay of an RACH received by the BS is equal to or less than a specific reference, RACH delay in consideration of only a portion of the number of samples of the effective channel section may be used.

[Table 7] below shows examples of configuring RACH formats for the number L of samples of effective channel sections. In detail, when timing advance (TA) or a reception delay point estimated by each UE is equal to or more than a reference value, Format #1 is used and, otherwise, Format #2 is used. Here, it can be seen that the number of users that can be supported by Format #2 is increased compared with users that can be supported by Format #1.

TABLE 7

| Format | Basic Zero-correlation zone length | Final Zero-correlation zone length | No. of available UEs |
|---|---|---|---|
| #1 | $N_{ZC}$ | $L + N_{ZC}$ | $\lfloor \frac{N}{L + N_{ZC}} \rfloor$ |
| #2 | $N_{ZC}$ | $L/2 + N_{ZC}$ | $\lfloor \frac{N}{L/2 + N_{ZC}} \rfloor$ |
| ... | ... | ... | ... | ii) Alternatively, an initial access UE may use an RACH format to which a longest effective channel length, that is, the number of samples of the effective channel section is reflected and then a format with a smaller number of samples of the effective channel section than L may be allocated.

In detail, the initial access user may use Format #1 of formats of Table 7 above and then receive signaling of the BS and use another format. The RACH is a channel that is periodically transmitted to the BS from the UE for an operation such as TA in addition to initial access of the UE, and thus, more zero-correlation zones may be configured using the same sequence so as to increase the number of users supported.

Figure 21:
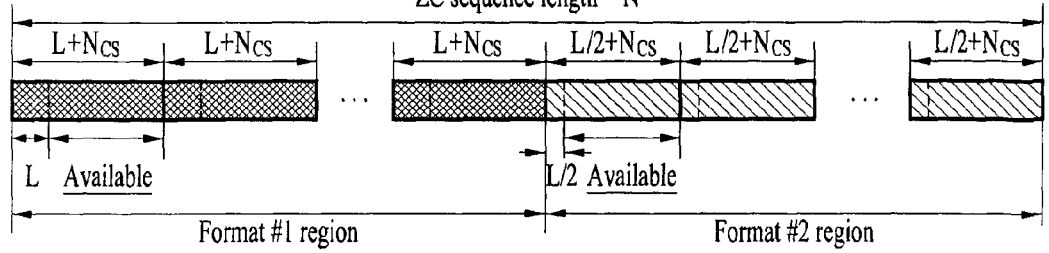
FIG. 21 illustrates an example in which the same ZC sequence is designed in Format #1 and Format #2.

Needless to say, when an overlapping or ambiguous region of the zero-correlation zone is not present, an objective can be achieved by configuring a portion of the same sequence region as the zero-correlation zone of Format #1 and configuring another portion as the zero-correlation zone of #2. FIG. 21 illustrates an example in which the same ZC sequence is designed in Format #1 and Format #2.

The present invention proposes a method of designing an effective sequence length for an RACH appropriate for a communication environment using a high carrier frequency band. In particular, a high carrier frequency band has high path loss due to a high center frequency and thus it is appropriate to apply the high carrier frequency band to a small cell. However, the present invention is not limited thereto.

Figure 22:
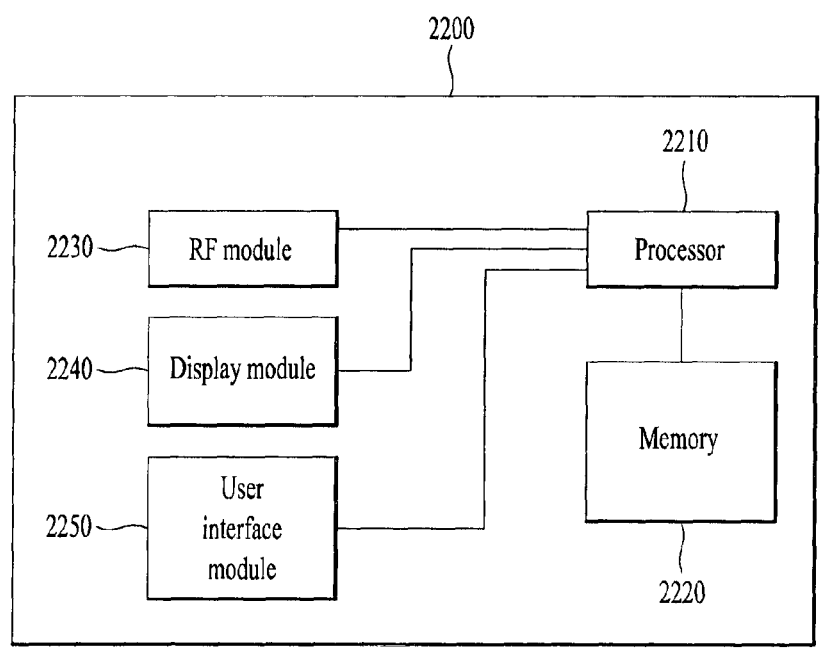
FIG. 22 is a block diagram of a communication apparatus according to an embodiment of the present invention.

FIG. 22 is a block diagram of a communication apparatus according to an embodiment of the present invention.

Referring to FIG. 22, a communication apparatus 2200 includes a processor 2210, a memory 2220, a Radio Frequency (RF) module 2230, a display module 2240, and a User Interface (UI) module 2250.

The communication device 2200 is shown as having the configuration illustrated in FIG. 22, for the convenience of description. Some modules may be added to or omitted from the communication apparatus 2200. In addition, a module of the communication apparatus 2200 may be divided into more modules. The processor 2210 is configured to perform operations according to the embodiments of the present invention described before with reference to the drawings. Specifically, for detailed operations of the processor 2210, the descriptions of FIGS. 1 to 21 may be referred to.

The memory 2220 is connected to the processor 2210 and stores an Operating System (OS), applications, program codes, data, etc. The RF module 2230, which is connected to the processor 2210, upconverts a baseband signal to an RF signal or downconverts an RF signal to a baseband signal. For this purpose, the RF module 2230 performs digital-to-analog conversion, amplification, filtering, and frequency upconversion or performs these processes reversely. The display module 2240 is connected to the processor 2210 and displays various types of information. The display module 2240 may be configured as, not limited to, a known component such as a Liquid Crystal Display (LCD), a Light Emitting Diode (LED) display, and an Organic Light Emitting Diode (OLED) display. The UI module 2250 is connected to the processor 2210 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example of applying a method and apparatus for configuring a random access sequence length for a high carrier frequency band in a wireless communication system to a 3$^{rd}$ generation partnership project (3GPP) long term evolution (LTE) system has been described, the present invention is applicable to various wireless communication systems in addition to the 3GPP LTE system.

The invention claimed is:

1. A method for receiving a random access sequence by a base station in a wireless communication system, the method comprising:
   selecting at least one random access format of a plurality of random access formats;
   transmitting information on the at least one selected random access format to a user equipment; and
   receiving a random access sequence based on the at least one selected random access format from the user equipment,
   wherein the plurality of random access formats have different effective channel section lengths for receiving the random access sequence, and
   wherein, when two or more random access formats are selected from the plurality of random access formats, the random access sequence received from the user equipment includes two or more sequence regions for each of the two or more random access formats.

2. The method according to claim 1, wherein the selecting comprises selecting a random access format for a maximum effective channel section length when a reception delay value of the user equipment is equal to or more than a preset value.

3. The method according to claim 1, wherein the selecting comprises selecting a random access format for a maximum effective channel section length when the user equipment is an initial access user equipment.

4. The method according to claim 1, wherein:
   the plurality of random access formats having different effective channel lengths have different numbers of supportable user equipments; and
   a random access format for a maximum effective channel section length has the supportable user equipments with a minimum number.

5. The method according to claim 1, wherein the random access sequence is a Zadoff-Chu (ZC) sequence.

6. A method of transmitting a random access sequence by a user equipment in a wireless communication system, the method comprising:
   receiving information on at least one random access format of a plurality of random access formats by the user equipment from a base station; and
   transmitting a random access sequence based on the at least one random access format to the base station,
   wherein the plurality of random access formats have different effective channel section lengths for receiving the random access sequence, and
   wherein, when two or more random access formats of the plurality of random access formats is included in the information, the random access sequence received from the user equipment includes two or more sequence regions for each of the two or more random access formats.

7. The method according to claim 6, wherein the at least one random access format is a random access format for a maximum effective channel section length when a reception delay value of the user equipment is equal to or more than a preset value.

8. The method according to claim 6, wherein the at least one random access format is a random access format for a maximum effective channel section length when the user equipment is an initial access user equipment.

9. The method according to claim 6, wherein:
   the plurality of random access formats having different effective channel lengths have different numbers of supportable user equipments; and
   a random access format for a maximum effective channel section length has the supportable user equipments with a minimum number.

10. The method according to claim 6, wherein the random access sequence is a Zadoff-Chu (ZC) sequence.

11. A user equipment configured to transmit a random access sequence in a wireless communication system, the user equipment comprising:
    a transceiver; and
    a processor operatively connected to the transceiver and configured to:
       receive information on at least one random access format of a plurality of random access formats from a base station; and
       transmit a random access sequence based on the at least one random access format to the base station,
       wherein the plurality of random access formats have different effective channel section lengths for receiving the random access sequence, and wherein, when two or more random access formats of the plurality of random access formats is included in the information, the random access sequence received from the user equipment includes two or more sequence regions for each of the two or more random access formats.

* * * * *